United States Patent [19]

Kienel

[11] 3,804,461
[45] Apr. 16, 1974

[54] PADDED VEHICLE SAFETY BELT

[76] Inventor: Paul A. Kienel, 14829 Jupiter St., Whittier, Calif. 90603

[22] Filed: Jan. 2, 1973

[21] Appl. No.: 320,290

[52] U.S. Cl. .............................................. 297/385
[51] Int. Cl. ............................................. A62b 35/00
[58] Field of Search .......... 297/384, 385, 389, 390; 280/150 SB, 150 AB; 2/2

[56] References Cited
UNITED STATES PATENTS

| | | | |
|---|---|---|---|
| 3,386,103 | 6/1968 | Robinson | 297/385 X |
| 3,397,913 | 8/1968 | Fein | 297/385 |
| 3,400,978 | 9/1968 | Totten | 297/389 |

*Primary Examiner*—Bobby R. Gay
*Assistant Examiner*—William E. Lyddane
*Attorney, Agent, or Firm*—Wm. Jacquet Gribble

[57] ABSTRACT

A vehicle safety belt passes through each of alternately disposed segments of a resilient belt pad. Each segment has a self-hinge and a passage for the belt web. The passage is at an angle to the run of the belt web such that retraction of the belt web folds the segments at the hinge line into a compact mass. Each end of the belt pad has a terminal segment with a strap fastener adapted to attach to either the belt latch at one end or the belt floor anchor at the other end. A latch end receptacle at the edge of the seat retains the compacted pad.

8 Claims, 6 Drawing Figures

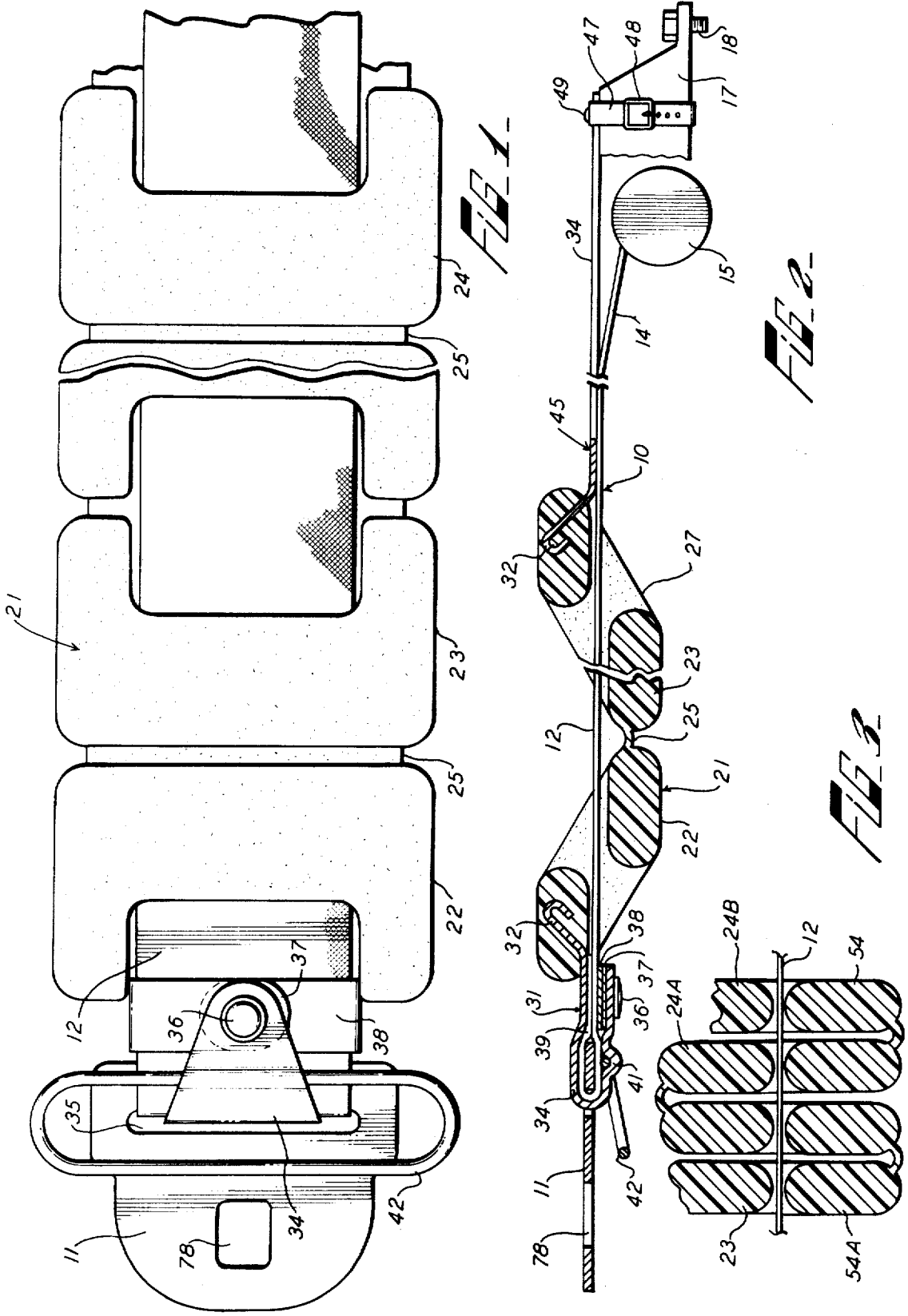

PADDED VEHICLE SAFETY BELT

BACKGROUND OF THE INVENTION

The invention relates to vehicle safety belts and more particularly to a safety belt with a pad adapted to intervene between the user and the restraining belt web. The present automotive safety belts, whether a lap belt or a shoulder harness, have proved effective in restraining a vehicle occupant in his seat. However, depending upon the forces imposed by a vehicle accident, the restraint belt web has inflicted injuries upon the user due to the violent changes in momentum. Kidney damage and neck and shoulder damage has been reported extensively in conditions where the restrained passenger has otherwise been protected by the restraint belt from collision with other portions of the vehicle. One of the problems is that in order to be effective as a restraint the belt must be made of relatively unyielding material. Canvas woven belt webs are conventionally used and, while they are strong and flexible, they are not resilient. Therefore, they afford little shock absorption when collisions impinge the passenger upon the restraint. I have invented a vehicle safety belt which not only is effective to restrain users with respect to the vehicle seats, but which absorbs potentially harmful relative motion between the restraint belt web and the user.

SUMMARY OF THE INVENTION

The invention contemplates, in a vehicle safety belt having a latch plate on a belt web and retraction anchoring means at one end of the belt, the improvement that comprises a segmented pad adapted to intervene between the wearer and the belt web. Each pad segment has a thin hinge section joining thicker segments to an adjacent section. Parallel spaced central walls in each segment define a passage for the seat belt web. When the pad is relaxed the parallel walls of each segment passage are at an angle to the general run of the belt web. A first terminal segment of the pad has fastening means adapted to fit about the safety belt latch. A second terminal segment has fastening means adapted to secure about the safety belt retraction anchoring means. When the belt is retracted the parallel passage walls and the hinges are displaced by the attached belt latch plate of the belt web such that the pad segments fold on the hinge lines and compress toward the retraction anchoring means. Preferably a small handle attached to the first terminal pad segment affords a hand grip to pull the retracted belt and pad about the wearer to its latching position from the retracted position at the anchoring means.

The safety belt of the invention pertains both to lap belts and to shoulder belts, as conventionally used. It also has application in other safety belt arrangements wherein the belt web passes across or adjacent the body of a user.

The safety belt of the invention provides for force absorption without interfering with the primary function of the safety belt, that is, to restrain the user to his preimpact position.

The pads may be of rubber or of foam plastic of various types with a thin outer skin to preclude abrasion of the foamed plastic. The invention does not preclude each pad segment being a resilient or elastic insert in a pocket.

These and other advantages of the invention are apparent from the following detailed description and drawing.

BRIEF DESCRIPTION OF THE DRAWING

FIG. 1 is a fragmentary elevation of the latch end of the padded seat belt of the invention;

FIG. 2 is a fragmentary plan section showing a pair of adjacent pad segments and the terminal pad segments in relationship to a schematically represented belt retractor;

FIG. 3 is a fragmentary sectional elevation of the embodiment of FIG. 1 in retracted or compacted position;

DESCRIPTION OF THE PREFERRED EMBODIMENTS

Figure 5:
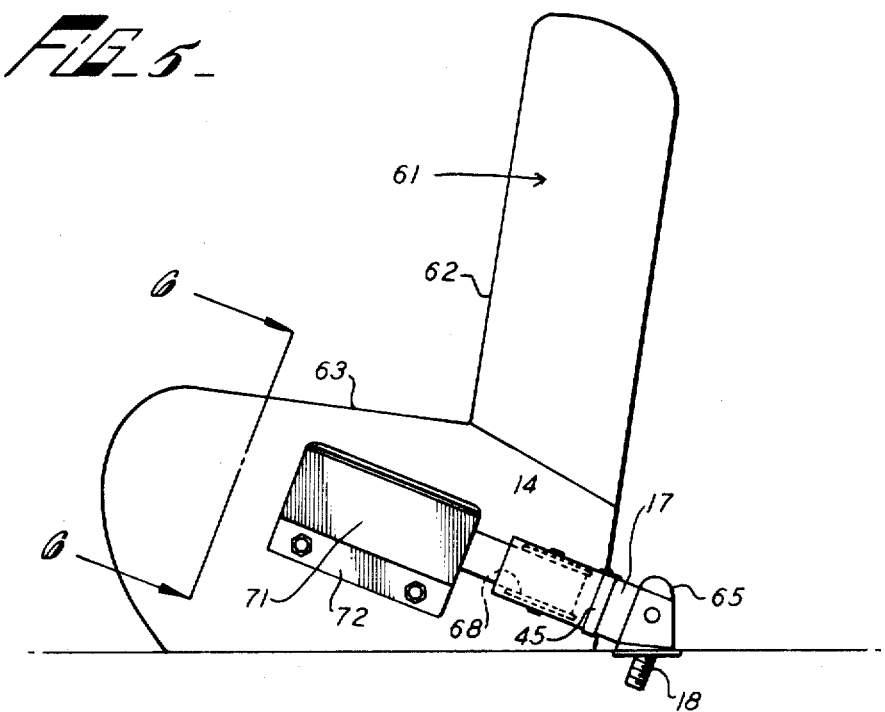
FIG. 5 is a fragmentary schematic elevation of the retracted seat belt in a seat supported container.

In the Figures like parts are identified by like reference characters.

In FIGS. 1 and 2, the longer retractable portion 10 of a conventional separable seat belt is fragmentarily shown. At its latching end the seat belt has a latch plate 11 to which one end of a belt web 12 is secured. The anchor end 14 of the belt web is secured to a schematically shown retractor means 15 which is normally held by an anchor receptacle 17 which is anchored by means such as the bolt 18 to the vehicle frame. A segmented resilient pad 21 in accordance with the invention is shown engaged with belt web 12. The pad is comprised of a plurality of segments, such as the segments 22, 23, 24 of FIG. 1. Adjoining segments are secured together by a thin hinge section 25. Preferably the hinge section and adjoining segments are integral. Segment 22 is a first terminal segment and a second terminal segment 27 (see FIG. 2) terminates the other end of the resilient pad.

A fastening strap is molded into each of the terminal segments. Strap 31 in segment 22 has a retaining hook 32 molded within the segment. Before being assembled with latch plate 11 the strap 31 has a T configuration. The elongate stem 34 of the T extends from the hook to pass through an aperture 35 of the latch plate, fold about the plate and taper to an end having a snap fastener 36. The bar of the T has an upper arm 37 and a lower arm 38, each of which wraps around the latch and the doubled end 39 of belt web 12 to be secured by snaps (not shown) lying beneath the snap 36 in FIG. 1.

The fastener stem 34 may have a tunnel portion 41 in which a wire oval handle 42 is secured for reasons to be discussed later. The fasteners may be of a preformed plastic such that both the hook portion 32 and tunnel portion 41 are preshaped, or the fastener 31 may be of a woven material which is held in the hook configuration at 32 when molded into the first terminal segment 22.

A somewhat similar T strap fastener 45 having a hook portion 32 is molded into the second terminal segment 27. Fastener 45 has an elongate stem 34 to which a bar strap 47 having a buckle 48 is secured in convenient fashion, as by a rivet 49. The bar strap 47 passes about the anchor base 17 for the seat belt and thus secures the second terminal segment to the anchor means.

Figure 4:
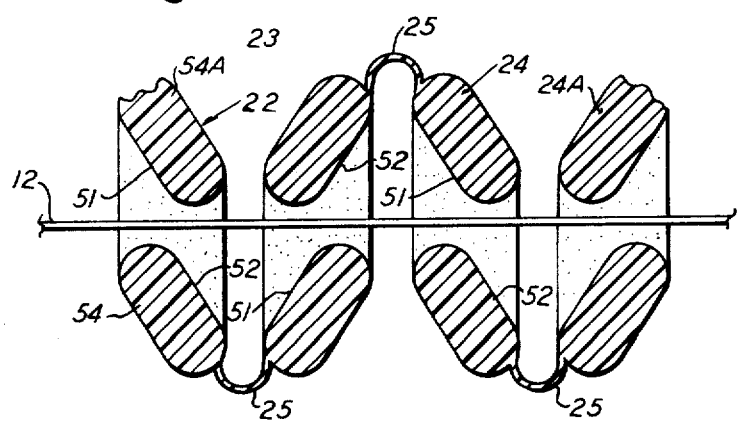
FIG. 4 is a fragmentary sectional view of the embodiment of FIG. 1 in a transitional position.

The resilient pad 21 of the invention is shown in FIGS. 2, 3 and 4 in varied configurations. In FIG. 4 segments 22, 23, 24 and 24A are shown in normal conditions as the pad may be molded in a single piece. The safety belt may be passed through the relaxed resilient pad, as shown by web 12 in FIG. 4. Each segment has a passage defined by spaced parallel walls 51, 52 such that each segment appears to have an oval post 54, 54A at each of its ends.

The hinges 25 may vary in their span to change the spacing of the pad segments along the safety belt web. However, it is preferred that the hinge span be small, as shown in FIG. 2 such that a maximum area of the safety belt is covered by the resilient pad segments.

Figure 6:
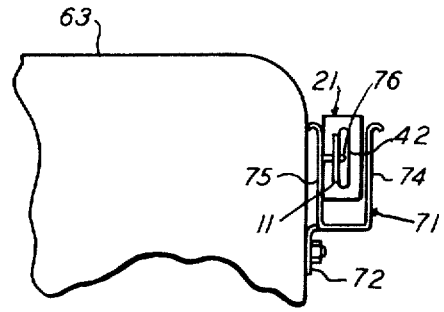
FIG. 6 is an end elevation of the embodiment of FIG. 5.

FIGS. 5 and 6 illustrate the safety belt of the invention in retracted position, with the anchor bolt 18 being shown related to the position of a car seat 61, which has a back 62 and a bench 63. Anchor bolt 18 may be secured to a bracket 65 and anchor 17 to which strap fastener 45 secures the pad to be held by the anchor bracket with respect to the auto frame. Web end 14 of the seat belt is engaged with a conventional belt take-up reel 68 shown schematically in dotted lines. Such an arrangement is conventional and is shown only in sufficient detail to make understandable the operation of the safety seat belt of the invention.

A retaining pocket 71 is secured by means of a bottom flange 72 to the side of bench 63 between the seat and the vehicle door. The pocket has spaced sides 74, 75, with a retaining pin 76 extending from side 75 to receive the latch plate 11 through its lock aperture 78. The oval handle 42 affords convenient means for the user to detach the latch plate from the pin 76 and draw both the seat belt and the resilient pad across the user to the conventional second belt portion with a latch buckle (not shown) such that the safety belt secures the user with respect to the seat.

While the illustrative embodiment of the invention is a lap belt, it is to be understood that the invention is not limited thereto. The various other types of belts, such as shoulder belts and dual torso belts which pass over both shoulders to the reverse of the car seat, benefit also from the teaching of the invention.

As previously mentioned, the resilient pad of the invention is illustrated in three phases. Since the first pad segment is secured to the latch plate, the resilient pad is extended when the latch plate is passed across the user to the safety belt buckle. Therefore, in FIG. 2 the pad is shown in extended orientation. As mentioned before, FIG. 4 shows the resilient pad in relaxed or originally formed configuration about a seat belt web 12.

In FIG. 3 the resilient pad is shown about a belt web 12 in the configuration the pad and belt obtain in the retracted position of FIG. 5 where the belt retracts to its anchor 17. The resilient pad segments are compressed together and distorted from their relaxed position, as in FIG. 4, due to the compression of the latch end at latch plate 11, as it retracts against first segment 22. The position of the segment posts 54, 54A, with respect to the pad hinges is changed under compression and the resilient pad achieves the compact position shown in FIG. 3.

It can be appreciated from the illustrations of the varied configurations that the material from which the resilient pad of the invention is made must have the characteristics of resiliency, elasticity and what is called "memory." Many plastics, particularly those foamed plastics which are equivalent in resiliency to foam rubber are suited to the purpose. Such plastics, and foam rubber itself, may be molded with a thin outer skin which guards against abrasive damage to the softer resilient foam cushion. However, the resilient pad may be molded and the skin applied to its outer surface by spraying or dipping.

It can be seen that the safety belt of the invention is capable of utilization in any situation wherein a restraint belt is used. Because of its configuration, the resilient pad may be retracted into a small space, increasing its utility.

It is to be understood that the embodiments shown are illustrative only and that many variations within the scope of the invention will occur to those skilled in this particular art. It is therefore desired that the invention be measured by the attached claims rather than by the illustrative embodiments disclosed herein.

I claim:

1. In a vehicle safety belt having a web belt with a latch plate for attachment to a buckle at one end and retracting anchoring means at the other end, the improvement comprising an elongate pad member, resilient pad segments adapted to intervene between the wearer and the belt web, a hinge section joining each pad segment to an adjacent pad segment, a pair of parallel walls spaced centrally of each segment defining a passage for the seat belt web; a first terminal segment, fastening means securing said first terminal segment to the safety belt latch plate; a second terminal pad segment, fastening means securing said second terminal segment to the safety belt anchoring means; said parallel walls being at an angle to the normal run of the belt web when the segmented pad is related such that belt retraction causes the pad to fold on its hinge lines as the belt is retracted toward the belt retraction anchoring means.

2. A safety belt in accordance with claim 1 wherein the fastening means for the first terminal segment comprises a strap integral with the segment and comprising an anchor hook, a lateral stem, a transverse bar, and a snap fastener on the end of each of the stem and bar.

3. A safety belt in accordance with claim 1 wherein the fastening means for the second terminal segment comprises an anchor hook formed in the segment, an elongate stem, a transverse bar adapted to attach to the anchor means and a fastener joining the bar and stem.

4. A safety belt in accordance with claim 1 wherein the retracting anchor means further comprises a pad retainer tray secured adjacent the seat of the vehicle, and a retaining pin adapted to receive the belt latch plate.

5. A safety belt in accordance with claim 1 further comprising a handle fixed to the latch plate end of the belt.

6. A safety belt in accordance with claim 5 wherein the fastening means for the first terminal segment fixes the handle to the safety belt.

7. A safety belt pad for use about a safety belt having a belt web with a latch plate and retracting anchor means and comprising a plurality of resilient pad segments, a hinge section joining adjacent segments, terminal segments at each end of the pad, means securing each terminal segment to the safety belt, and parallel spaced walls defining a passage through each segment for the belt web, said passages orienting the pad with respect to the web such that the pad intervenes between the belt web and the wearer.

8. A safety belt pad in accordance with claim 7 wherein the spaced, parallel walls are oriented in the relaxed pad at an angle to the general run of the web belt.

* * * * *